March 12, 1935. J. A. JESSEN Re. 19,495

LONG DRAFT SPINNING MECHANISM

Original Filed May 28, 1931

INVENTOR.

John A. Jessen

BY Jeffrey, Kinsman & Eggleston

ATTORNEYS

Reissued Mar. 12, 1935

Re. 19,495

UNITED STATES PATENT OFFICE 19,495

LONG DRAFT SPINNING MECHANISM

John A. Jessen, Whitinsville, Mass., assignor to Whitin Machine Works, Whitinsville, Mass., a corporation of Massachusetts Original No. 1,914,603, dated June 20, 1933, Serial No. 540,666, May 28, 1931. Application for reissue December 21, 1934, Serial No. 758,651

4 Claims. (Cl. 19—131)

This invention relates to long draft spinning mechanism in which textile fibres are forwarded from feed rolls to drawing rolls by means of short belts having closely adjacent and substantially parallel runs, between which the fibres are directed. These belts are positioned in part by upper and lower rolls, at least one of which is driven. The belts are also positioned in part by guide-rods, located at the delivery end of the parallel belt runs and holding the belts in definitely spaced relation at the delivery point.

It has been found that the round guide-rods heretofore commonly used accumulate lint and short fibers. This material wraps itself around the guide-rods, thus in effect increasing the diameter of the guide-rods and decreasing the distance between the parallel belt runs at the delivery point. This varies the drawing action of the long draft mechanism.

It is the general object of my present invention to provide guide-rods of improved construction for use in long draft mechanism, so designed that the accumulation of lint and fibre thereon is effectively prevented.

My invention further relates to arrangements and combinations of parts which will be hereinafter described and more particularly pointed out in the appended claims.

A preferred form of the invention and a slight modification thereof are shown in the drawing, in which Fig. 1 is a sectional side elevation of parts of a long draft spinning mechanism having my invention embodied therein;

Figure 1:
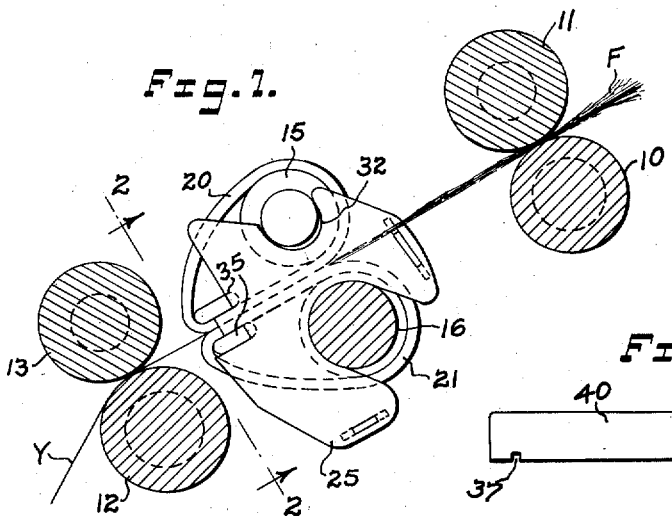

Referring to the drawing, I have shown portions of a long draft spinning mechanism including feed rolls 10 and 11 for the fibre F, drawing rolls 12 and 13 from which the yarn Y is delivered, and long draft rolls 15 and 16 for the upper and lower long draft belts 20 and 21.

A guide frame is mounted on the lower long draft roll 16 and comprises side members 25 and 26 and cross frame members 27 and 28. The side frame members are recessed, as indicated at 30, to fit over reduced portions of the long draft roll 16, and are also provided with upper recesses 32 to receive the upper long draft roll 15.

The side members 25 and 26 are also provided with shoulders 33 and projections 34 for positioning a pair of guide-bars 35, preferably connected at one end to form an integral U-shaped member. The guide-bars 35 are positioned above and below the projections 34, with the lower guide-bar resting on the shoulders 33 of the side members 25 and 26.

The guide-bars 35 are provided with notches 37 at one end and shoulders 38 at the other end. When the bars are positioned in the guide frame, the notches 37 slip over the edge of the frame member 26, while the shoulders 38 engage the inner face of the frame member 25.

The guide-bars are thus securely held from lateral or endwise displacement, and are prevented from slipping downwardly toward the drawing rolls 12 and 13 by the belts 20 and 21, which encircle the rolls 15 and 16 and also the upper and lower guide-bars 35.

Figure 5:
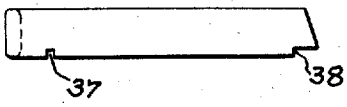
Fig. 5 is a plan view thereof.

Reference to Figs. 1 and 5 will show that the guide-bars are found of relatively wide flat stock, preferably having rounded edges. As shown in the drawing, the width of the stock is preferably not less than twice the thickness of the stock and may be substantially more than twice the thickness.

Figure 6:
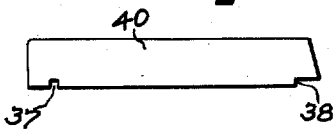
Fig. 6 is a plan view of a slightly modified guide-bar.
Figure 2:
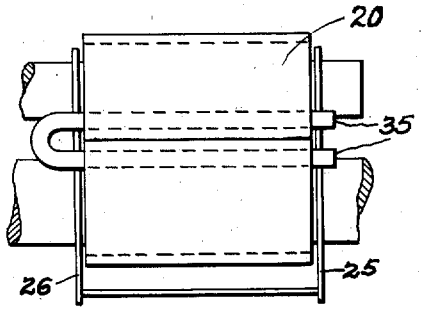
Fig. 2 is an end view of the mechanism, looking in the direction of the arrow 2 in Fig. 1.
Figure 3:
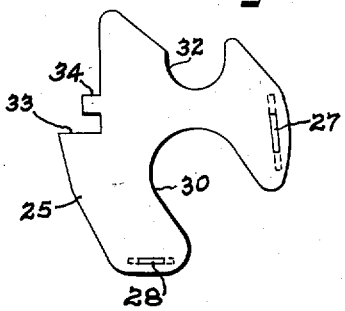
Fig. 3 is a side elevation of the frame in which the upper roll and guide-bars are supported.
Figure 4:
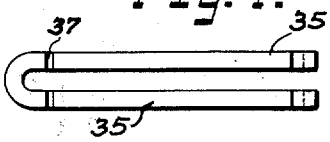
Fig. 4 is a side elevation of one form of my improved guide-bar.
Figure 7:
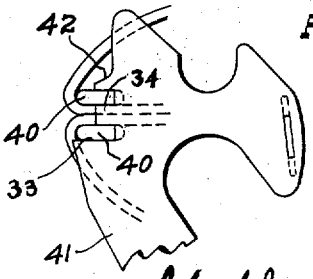
Fig. 7 is a partial side elevation of a guide frame for supporting the type of guide-bar shown in Fig. 6.

The construction shown in Figs. 6 and 7 is substantially the same as that previously described, except that the guide-bars 40 are formed as separate units, and that the side frames 41 (Fig. 7) are provided with additional upper lugs or projections 42 to prevent upward displacement of the upper guide-bar 40. Otherwise the constructions are identical. The projections in both cases form notches for the upper and lower guide-bars which notches are parallel with the path of fibre travel and serve to retain the flat faces of the bars also substantially parallel thereto.

The great advantage of my invention rests in the provision of guide-bars of much increased width in place of the round rods previously used. I have found by actual test that these guide-bars of increased width, such as are shown in the drawing, do not accumulate lint or short fibres as was the case with the round guide-rods previously used, and consequently the space between the parallel runs of the belts is not reduced by such accumulations. Consequently uniform action of the long draft mechanism is achieved and the quality of the product is improved. Such flat guide bars, while securely interlocked to the notches or frame, are nevertheless quickly removable, by pulling forwardly on the projecting end and stretching the belt sufficiently to permit disengagement of the shouldered formation.

Having thus described my invention and the advantages thereof, I do not wish to be limited to the details herein disclosed, otherwise than as set forth in the claims, but what I claim is:

1. In a long draft spinning apparatus, upper and lower long draft rolls, a guide frame mounted on the lower roll and positioning the upper roll, upper and lower short belts for said rolls, and guide-bars mounted on said guide frame or said belts, said guide-bars being formed as parts of a U-shaped member and each guide-bar being formed of flat stock of substantial width, said frame having a projection closely fitting between the upper and lower parts of said U-shaped guide member and holding said parts in predetermined spaced relation, and said frame having a shoulder underlying and supporting the lower guide bar.

2. In a long draft spinning apparatus, upper and lower long draft rolls, a guide frame mounted on the lower roll and positioning the upper roll, upper and lower short belts for said rolls, and guide-bars mounted on said guide frame for said belts, said guide-bars being formed as parts of a U-shaped member and each guide-bar being formed of flat stock of substantial width, said frame having a projection closely fitting between the upper and lower parts of said U-shaped guide member and having a shoulder underlying and supporting the lower guide bar and said guide-bars being notched to receive the edge of one side of said frame and having shoulders abutting the inner face of the other side of said frame.

3. In long draft spinning mechanism of the kind having front and rear pairs of draft rolls, a guide frame the body of which is held fixed between them and draft belts within the frame encircling the rear rolls and conducting the fibres close into the bite of the front rolls; the improvement which consists of a removable flat-sectioned guide-bar member encircled by the front end of one of said belts and seated in a notch formed in a front edge of said frame, the notch being parallel to the path of the fibre and holding said bar member with its flat face substantially parallel to said path, said bar member having a shouldered formation on its rear edge for engaging the edge of said notch in the frame to prevent endwise shifting of the bar member and being normally held thus interlocked with the frame by the tension of the draft belt which encircles it, said bar member further having an end portion projecting beyond the side of the frame forming a finger hold suited for use to stretch the belt forwardly to disengage said guide-bar member from the guide frame and permit the guide-bar member to be removed endwise from within said belt and from within the notch of said frame.

4. In long draft spinning mechanism of the kind having front and rear pairs of draft rolls, a guide frame the body of which is held fixed between them and draft belts within the frame encircling the rear rolls and conducting the fibres close into the bite of the front rolls; the improvement which consists of two separate flat-faced guide-bar members respectively encircled by the front ends of said belts and removably seated in notches formed in the front portion of said frame, the notches being parallel to the path of the fibre and holding said bar members in spaced relation from each other with their flat faces substantially parallel to said path, said bar members having shouldered formations on their rear edges for engaging the edge of said notches in the frame to prevent endwise shifting of the bar members and being normally held thus interlocked with the frame by the tension of the draft belts which encircle them, said bar members further having end portions projecting beyond the side of the frame forming finger holds suited for use to stretch their respective belts forwardly to disengage said guide-bar members from the guide frame and permit them to be individually removed endwise from within their belts and from within the notches of said frame.

JOHN A. JESSEN